United States Patent
Nakasaka

(10) Patent No.: US 7,854,217 B2
(45) Date of Patent: Dec. 21, 2010

(54) IDLING CONTROL DEVICE OF SPARK IGNITION TYPE INTERNAL COMBUSTION ENGINE

(75) Inventor: Yukihiro Nakasaka, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 279 days.

(21) Appl. No.: 12/230,600

(22) Filed: Sep. 2, 2008

(65) Prior Publication Data

US 2009/0064966 A1 Mar. 12, 2009

(30) Foreign Application Priority Data

Sep. 6, 2007 (JP) .............................. 2007-231721

(51) Int. Cl.
*F02P 5/04* (2006.01)
(52) U.S. Cl. .............................. 123/339.11; 123/406.24
(58) Field of Classification Search ................. 123/316, 123/339.1, 339.11, 339.24, 406.11–406.13, 123/406.23–406.24, 406.59, 676; 701/101–105, 701/110, 114; 60/285
See application file for complete search history.

(56) References Cited

U.S. PATENT DOCUMENTS

| | | | | |
|---|---|---|---|---|
| 5,884,605 | A * | 3/1999 | Nagaishi et al. ........ | 123/339.11 |
| 6,223,723 | B1 * | 5/2001 | Ito ........................ | 123/406.51 |
| 6,595,186 | B2 * | 7/2003 | Hiyoshi et al. .......... | 123/406.29 |
| 6,769,404 | B2 * | 8/2004 | Aoyama et al. ......... | 123/406.29 |
| 7,194,987 | B2 * | 3/2007 | Mogi ...................... | 123/48 C |
| 7,669,559 | B2 * | 3/2010 | Aoyama et al. .......... | 123/48 B |
| 2002/0139346 | A1 | 10/2002 | Aoyama et al. | |
| 2003/0051685 | A1 * | 3/2003 | Hiyoshi et al. .......... | 123/78 E |
| 2003/0213451 | A1 | 11/2003 | Aoyama et al. | |
| 2004/0134464 | A1 * | 7/2004 | Mogi ...................... | 123/406.12 |

FOREIGN PATENT DOCUMENTS

| | | |
|---|---|---|
| JP | A-62-142859 | 6/1987 |
| JP | A-63-255568 | 10/1988 |
| JP | A-64-80752 | 3/1989 |
| JP | A-1-92538 | 4/1989 |
| JP | A-1-104969 | 4/1989 |
| JP | A-2002-276446 | 9/2002 |
| JP | A-2002-285898 | 10/2002 |
| JP | A-2003-328794 | 11/2003 |

* cited by examiner

*Primary Examiner*—Stephen K Cronin
*Assistant Examiner*—Johnny H Hoang
(74) *Attorney, Agent, or Firm*—Oliff & Berridge, PLC

(57) ABSTRACT

A spark ignition internal combustion engine in which, during an idling operation, the ignition timing is changed temporarily to the advance side or retard size with respect to the reference ignition timing so that when the engine speed deviates from the target idling speed, the engine speed becomes the target idling speed. When the actual compression ratio at the time of idling is changed, the reference ignition timing at the time of idling is made to move until the ignition timing at which the same generated torque of the engine is obtained.

9 Claims, 13 Drawing Sheets

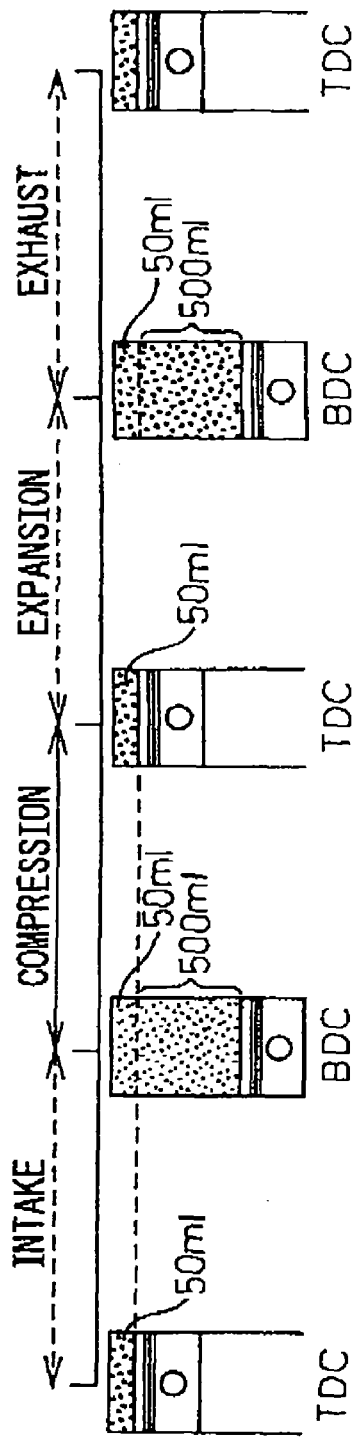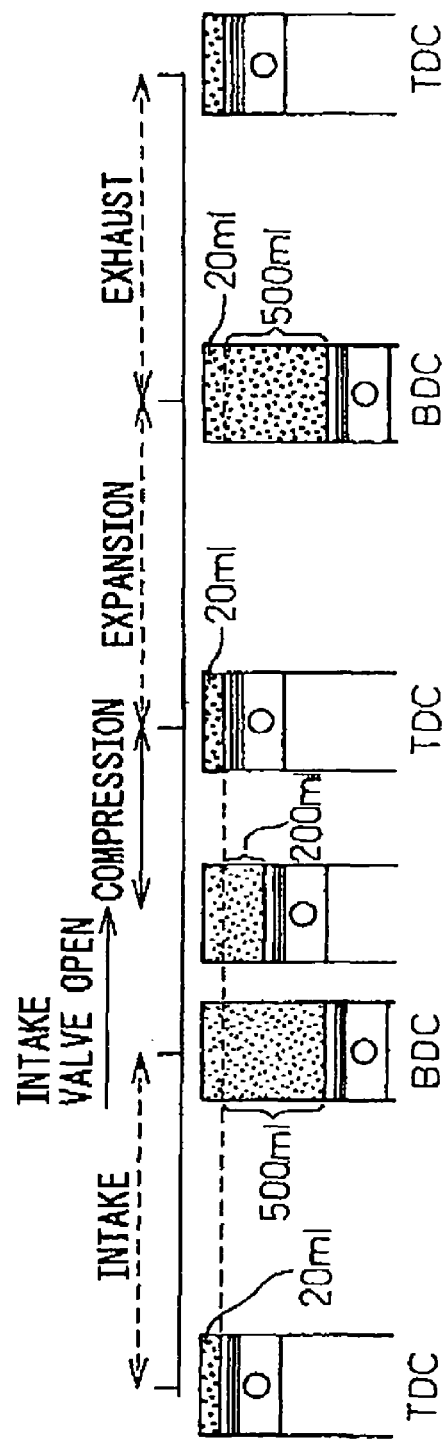

IDLING CONTROL DEVICE OF SPARK IGNITION TYPE INTERNAL COMBUSTION ENGINE

BACKGROUND OF THE INVENTION

1. Field of the Invention

The present invention relates to an idling control device of a spark ignition type internal combustion engine.

2. Description of the Related Art

As a method of controlling an engine speed at the time of idling to a target idling speed, there is a method of changing a throttle valve opening degree and thereby controlling the intake air amount when the engine speed deviates from the target idling speed so that the engine speed becomes the target idling speed. However, in this case, there is a problem in that there is a time delay from when the amount of intake air supplied in an engine cylinder changes until the generated torque of the engine changes, so the engine speed cannot be made to easily settle down to the target idling speed.

In contrast, the generated torque of an engine changes immediately if changing the ignition timing, so the engine speed may be returned to the target idling speed with good response by controlling the ignition timing so that the engine speed becomes the target idling speed. However, there is a limit to the amount of change of a generated torque of an engine by changing the ignition timing. The generated torque of the engine cannot be changed by a large extent as when the intake air amount is changed.

Known in the art is an internal combustion engine designed to simultaneously control the intake air amount and the ignition timing so that when the engine speed deviates from the target idling speed, the engine speed becomes the target idling speed (see for example Japanese Patent Publication (A) No. 64-80752).

On the other hand, when an actual compression ratio changes, the amount of change of the generated torque of the engine when changing the ignition timing greatly changes, and the lower the actual compression ratio, the greater the amount of change of the generated torque of the engine when changing the ignition timing. In this case, if the amount of change of the generated torque of the engine when changing the ignition timing is great, due to the occurrence of hunting, the engine speed will not easily settle down to the target idling speed. If the amount of change of the generated torque of the engine when changing the ignition timing is small, time is needed until the engine speed settles down to the target idling speed. That is, there is an optimal value for the amount of change of the generated torque of the engine when changing the ignition timing.

Accordingly, in a spark ignition type internal combustion engine able to change the actual compression ratio, when changing the actual compression ratio at the time of idling, it is necessary to make the amount of change of the generated torque of the engine when changing the ignition timing become optimum no matter what the actual compression ratio.

SUMMARY OF THE INVENTION

The object of the present invention is to provide an idling control device of a spark ignition type internal combustion engine able to make the amount of change of the generated torque of the engine when changing the ignition timing an optimal amount of change no matter what the actual compression ratio at the time of idling.

According to the present invention, there is provided an idling control device of a spark ignition type internal combustion engine capable of changing an actual compression ratio, wherein the device comprises an ignition timing control device which maintains an ignition timing at a reference ignition timing determined in advance in accordance with an operating condition of the engine when an engine speed is maintained at a target idling speed at the time of idling operation and which changes the ignition timing to an advance or retard side temporarily with respect to the reference ignition timing so that when the engine speed deviates from the target idling speed, the engine speed becomes the target idling speed, and when the actual compression ratio is changed at the time of idling, at least one of ratio of an amount of change of the ignition timing with respect to an amount of deviation of the engine speed from the target idling speed or the reference ignition timing is changed in accordance with the actual compression ratio so that when the engine speed deviates from the target idling speed, an amount of change of a generated torque of the engine due to the change of the ignition timing becomes substantially the same regardless of the actual compression ratio.

BRIEF DESCRIPTION OF THE DRAWINGS

These and other objects and features of the present invention will become more apparent from the following description of the preferred embodiments given with reference to the attached drawings, in which:

FIGS. 8A and 8B are views for explaining an ordinary cycle and superhigh expansion ratio cycle;

DESCRIPTION OF THE PREFERRED EMBODIMENTS

Figure 1:
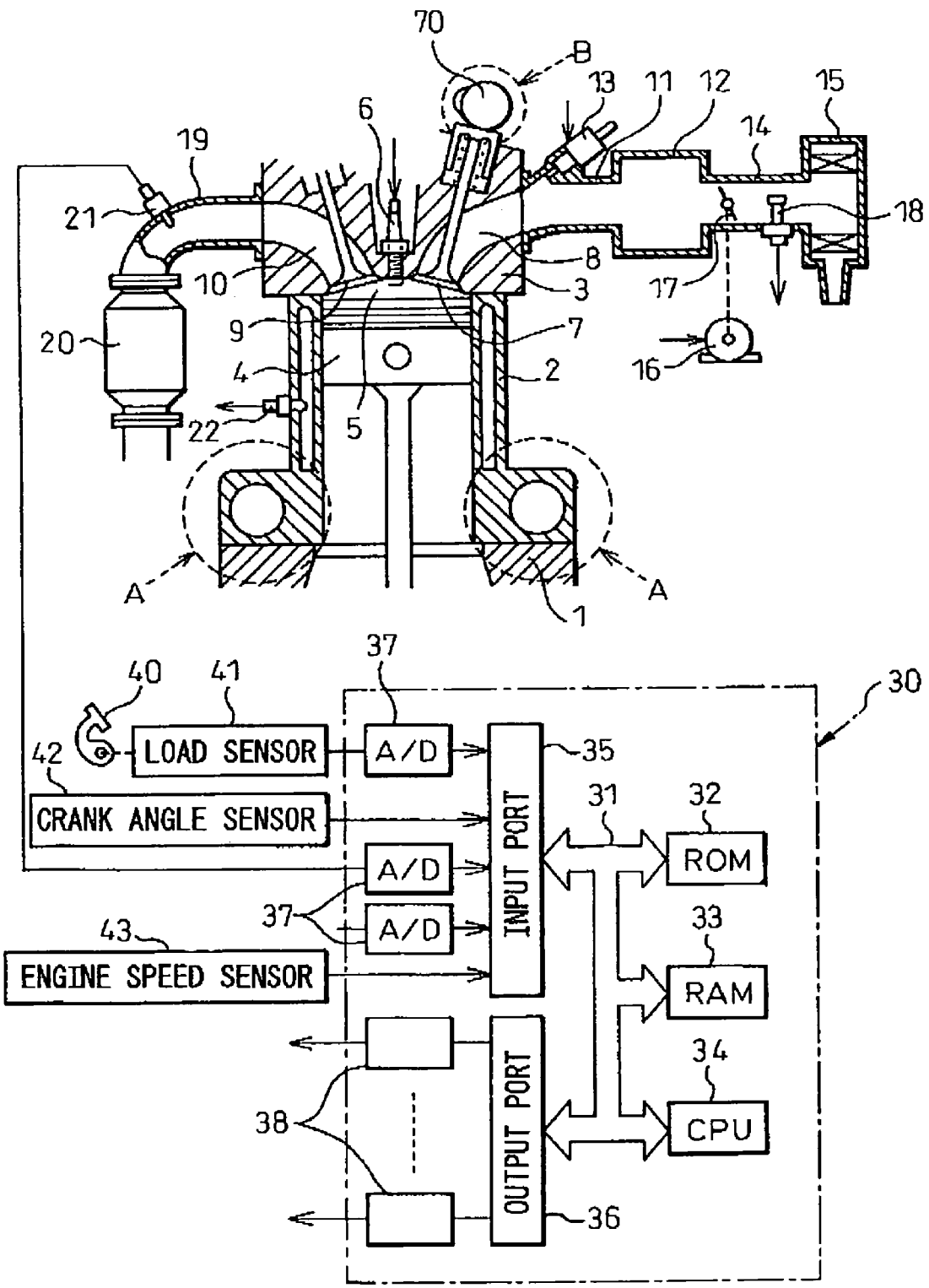
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst, while the exhaust manifold 19 is provided inside it with an air-fuel ratio sensor 21. In addition, a water temperature sensor 22 for detecting the temperature of engine cooling water is attached to the cylinder block 2.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18, the output signal of the air-fuel ratio sensor 21 and the output signal of the water temperature sensor 22 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B.

Figure 2:
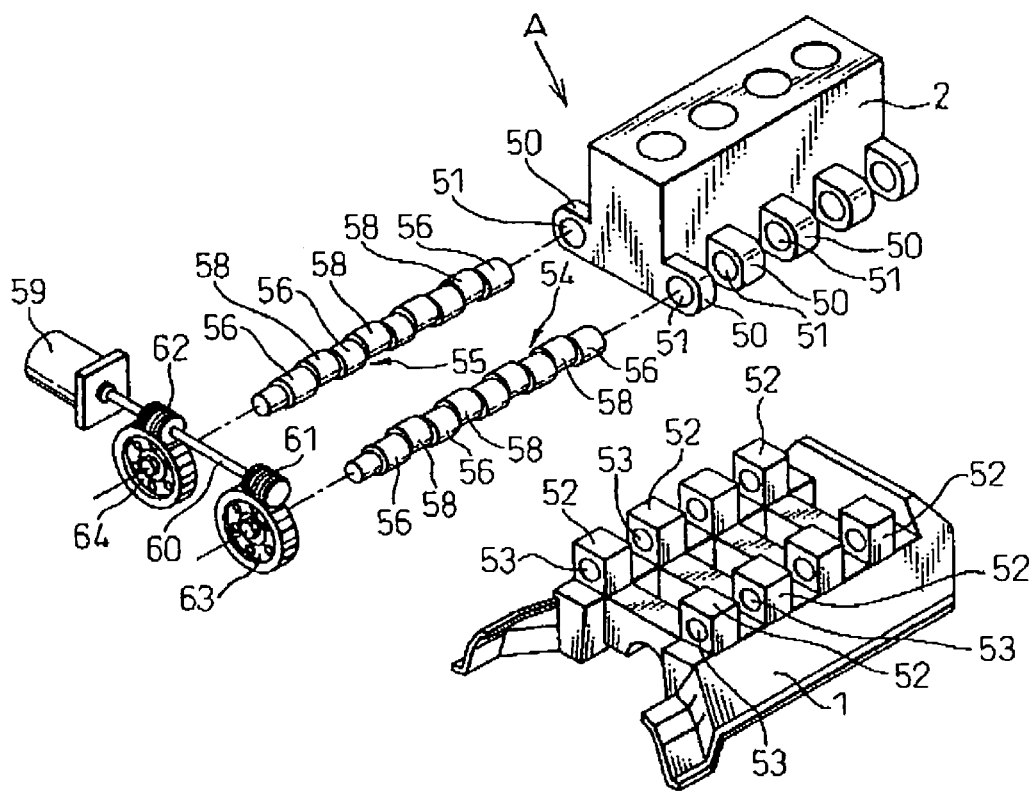
FIG. 2 is a disassembled perspective view of a variable compression ratio mechanism.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIGS. 3A and 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

Figure 3A:
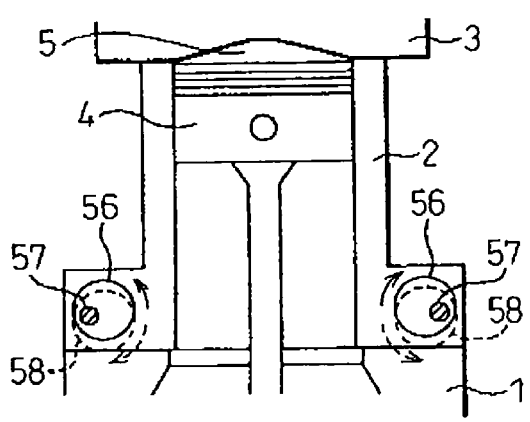
FIGS. 3A and 3B are side cross-sectionals view of the illustrated internal combustion engine.
Figure 3B:
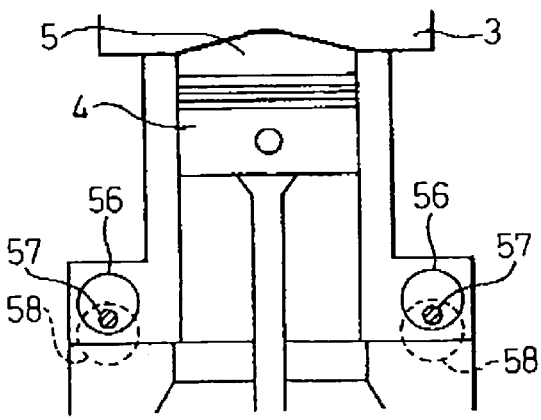

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIGS. 3A and 3B shows an example. Any type of variable compression ratio mechanism may be used.

Figure 4:
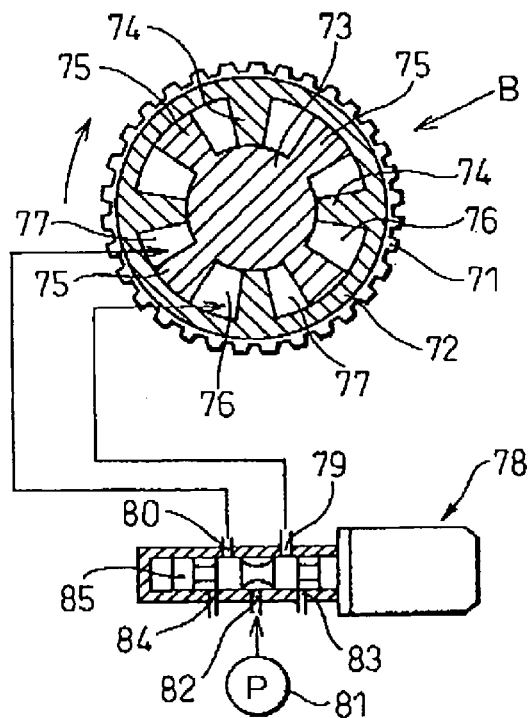
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
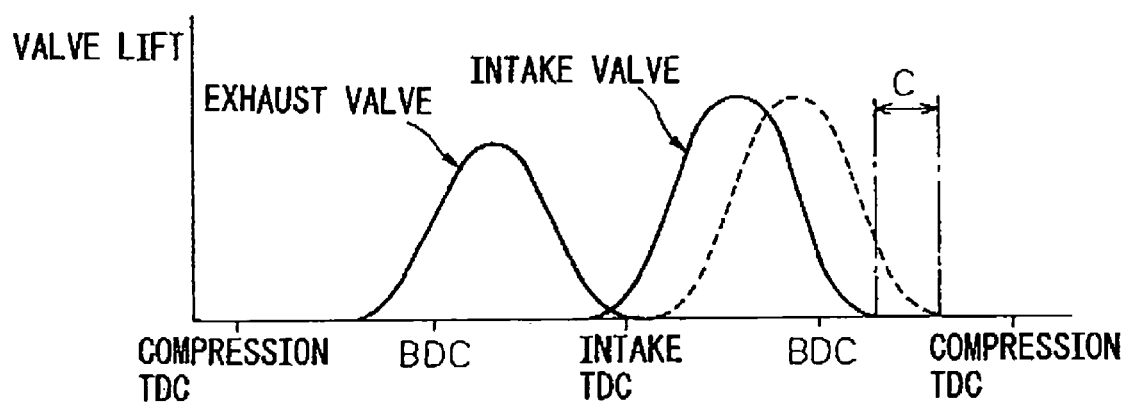
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve taming mechanism or other various types of variable valve timing mechanisms able to change only the closing timing of the intake valve while maintaining the opening timing of the intake valve constant can be used.

Figure 6A:
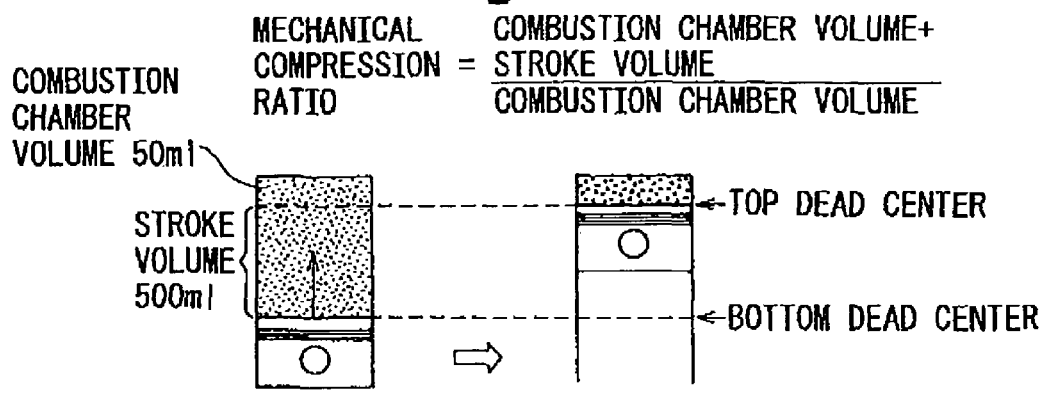
FIGS. 6A to 6C are views for explaining the engine compression ratio, actual compression ratio, and expansion ratio.
Figure 6B:
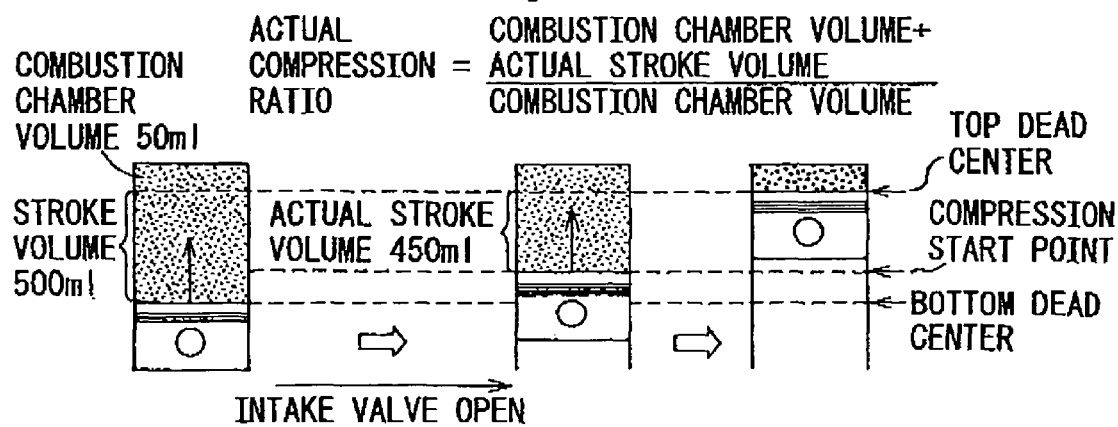
Figure 6C:
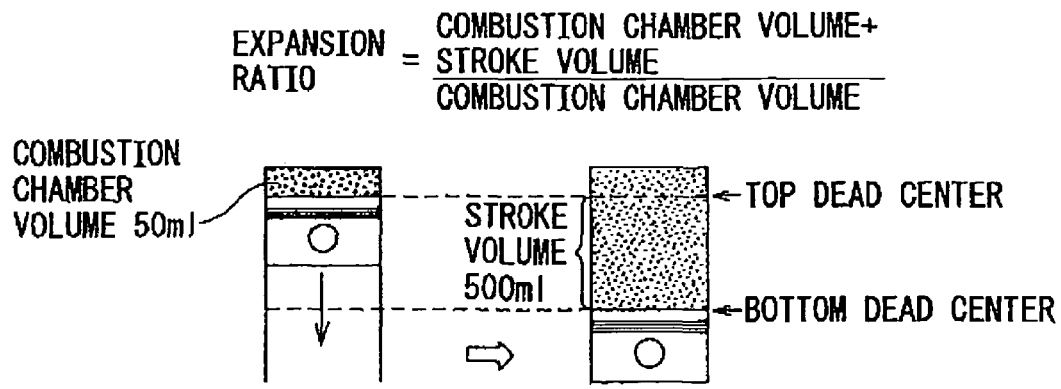

Next, the meaning of the terms used in the present application will be explained with reference to FIGS. 6A to 6C. Note that FIGS. 6A, 6B, and 6C show for explanatory purposes an engine with a volume of the combustion chambers of 50 ml and a stroke volume of the piston of 500 ml. In these FIGS. 6A, 6B and 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, a superhigh expansion ratio cycle used in the present invention will be explained with reference to FIG. 7 and FIGS. 8A and 8B. Note that FIG. 7 shows the relationship between the theoretical thermal efficiency and the expansion ratio, while FIGS. 8A and 8B show a comparison between the ordinary cycle and superhigh expansion ratio cycle used selectively in accordance with the load in the present invention.

FIG. 8A shows the ordinary cycle when the intake valve closes near the bottom dead center and the compression action by the piston is started from near substantially compression bottom dead center. In the example shown in this FIG. 8A as well, in the same way as the examples shown in FIGS. 6A, 6B and 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
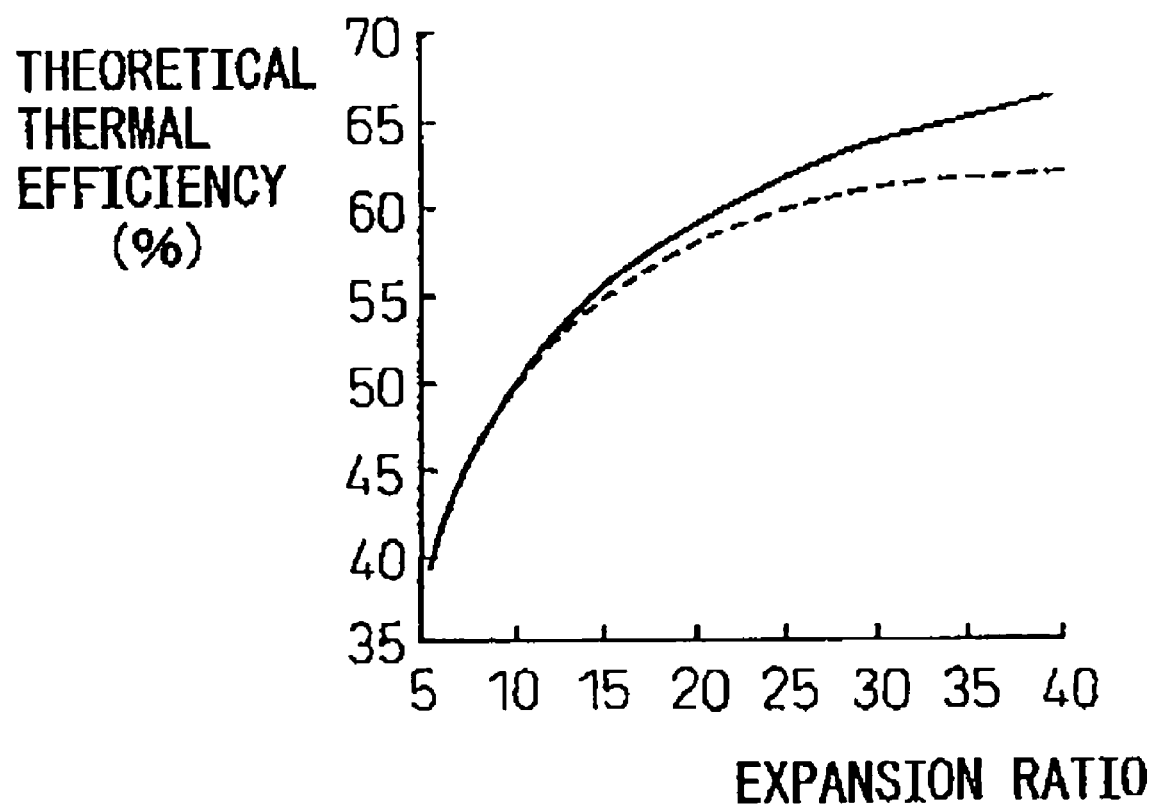
FIG. 7 is a view showing the relationship between the theoretical thermal efficiency and expansion ratio.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8B shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the embodiment of the present invention, at the time of engine low load operation, the superhigh expansion ratio cycle shown in FIG. 8B is set, while at the time of engine high load operation, the ordinary cycle shown in FIG. 8A is set. This is the basic feature of the present invention.

Next, the operational control as a whole will be explained with reference to FIG. 9.

Figure 9:
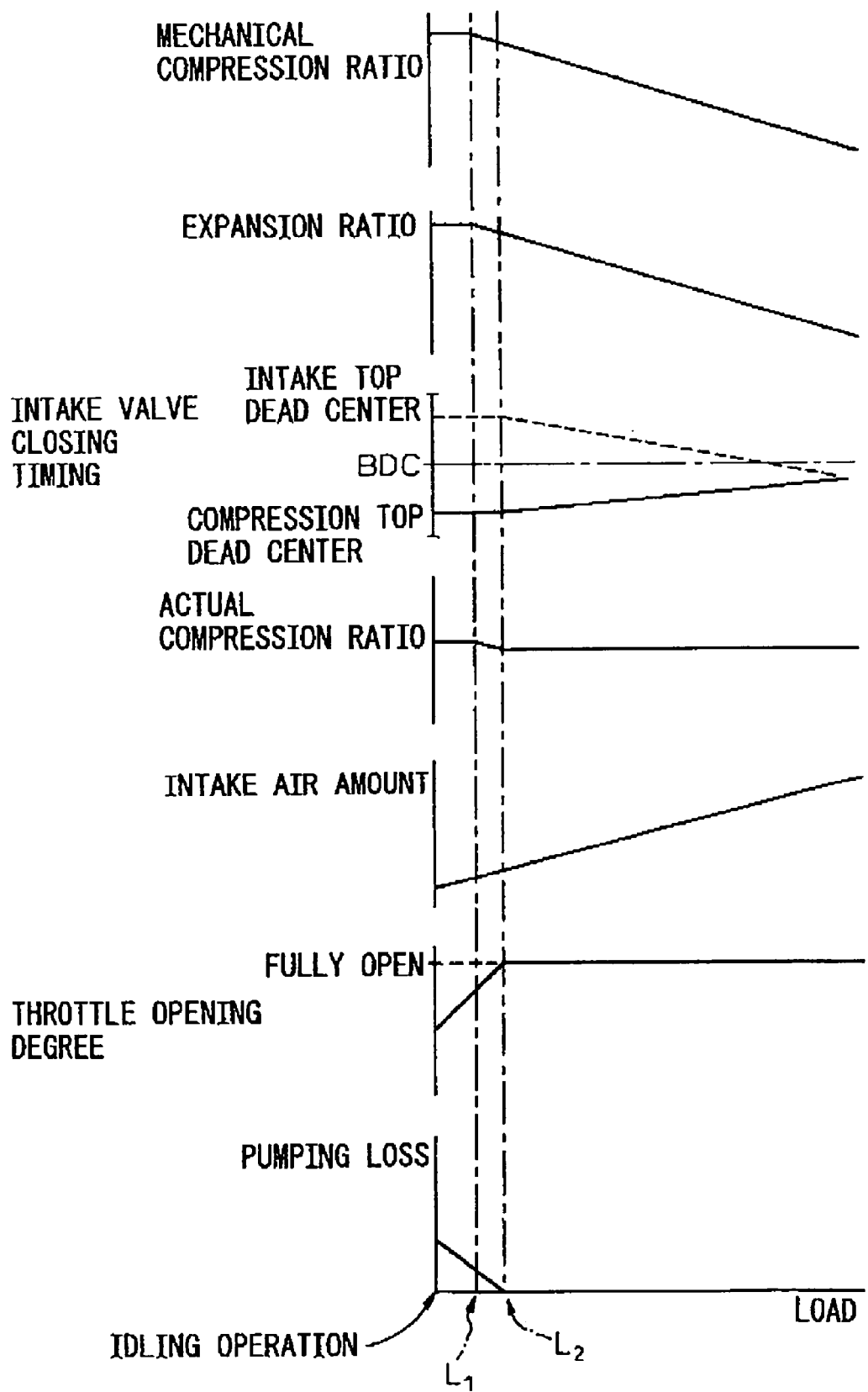
FIG. 9 is a view showing the change in mechanical compression ratio etc. in accordance with the engine load.

FIG. 9 shows the changes in the mechanical compression ratio, expansion ratio, closing timing of the intake valve 7, actual compression ratio, the amount of intake air, opening degree of the throttle valve 17, and pumping loss along with the engine load. Note that in the embodiment according to the present invention, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8A is executed. Therefore, as shown in FIG. 9, at this time, since the mechanical compression ratio is made low, the expansion ratio becomes low. As shown by the solid line in low in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown in FIG. 9, along with the reduction in the engine load, the mechanical compression ratio is increased, therefore the expansion ratio is also increased. Further, at this time, the closing timing of the intake valve 7 is delayed as the engine load becomes lower as shown by the solid line in FIG. 9 so that the actual compression ratio is held substantially constant. Note that at this time as well, the throttle valve 17 is held at the fully opened or substantially fully opened state. Therefore the amount of intake air fed to the combustion chamber 5 is controlled not by the throttle valve 17, but by changing the closing timing of the intake valve 7. At this time as well, the pumping loss becomes zero.

In this way when the engine load becomes lower from the engine high load operating state, the mechanical compression ratio is increased along with the fall in the amount of intake air under a substantially constant actual compression ratio. That is, the volume of the combustion chamber 5 when the piston 4 reaches compression top dead center is reduced proportionally to the reduction in the amount of intake air. Therefore the volume of the combustion chamber 5 when the piston 4 reaches compression top dead center changes proportionally to the amount of intake air. Note that at this time, the air-fuel ratio in the combustion chamber 5 becomes the stoichiometric air-fuel ratio, so the volume of the combustion chamber 5 when the piston 4 reaches compression top dead center changes proportionally to the amount of fuel.

If the engine load becomes further lower, the mechanical compression ratio is further increased. When the mechanical compression ratio reaches the limit mechanical compression ratio forming the structural limit of the combustion chamber 5, in the region of a load lower than the engine load $L_1$ when the mechanical compression ratio reaches the limit mechanical compression ratio, the mechanical compression ratio is held at the limit engine compression ratio. Therefore at the time of engine low load operation, the mechanical compression ratio becomes maximum, and the expansion ratio also becomes maximum. Further, at this time, the actual compression ratio is maintained at an actual compression ratio substantially the same as that at the time of engine medium and high load operation.

On the other hand, as shown by the solid line in FIG. 9, the closing timing of the intake valve 7 is delayed to the limit closing timing enabling control of the amount of intake air fed to the combustion chamber 5 as the engine load becomes lower. In the region of a load lower than the engine load $L_2$ when the closing timing of the intake valve 7 reaches the limit closing timing, the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 9, at this time, that is, in the region of a load lower than the engine load $L_2$ when the closing timing of the intake valve 7 reaches the limit closing timing, the throttle valve 17 is used to control the amount of intake air fed to the combustion chamber 5. Accordingly, also at the time of idling, the throttle valve 17 is used to control the amount of intake air fed to the combustion chamber 5. However, if using the throttle valve 17 to control the amount of intake air, as shown in FIG. 9, the pumping loss increases.

On the other hand, as explained above, in the superhigh expansion ratio cycle shown in FIG. 8B, the expansion ratio is made 26. The higher this expansion ratio, the better, but if 20 or more, a considerably high theoretical thermal efficiency can be obtained. Therefore, in the present invention, the variable compression ratio mechanism A is formed so that the expansion ratio becomes 20 or more. Further, in the example shown in FIG. 9, the mechanical compression ratio is changed continuously in accordance with the engine load. However, the mechanical compression ratio can also be changed in stages in accordance with the engine load.

On the other hand, as shown by the broken line in FIG. 9, as the engine load becomes lower, by advancing the closing timing of the intake valve 7 as well, it is possible to control the amount of intake air without depending on the throttle valve 17. Therefore, in FIG. 9, if comprehensively expressing both the case shown by the solid line and the case shown by the broken line, in the embodiment according to the present invention, the closing timing of the intake valve 7 is shifted as the engine load becomes lower in a direction away from compression bottom dead center BDC until the limit closing timing $L_2$ enabling control of the amount of intake air fed into the combustion chamber.

As shown in FIG. 9, at the time of idling, usually, the mechanical compression ratio is made the maximum value. However, in the embodiment of the present invention, the mechanical compression ratio at the time of idling is changed according to need. For example, in the embodiment of the present invention, at the time of idling, particularly at the time of warm-up immediately after starting up the engine, the mechanical compression ratio is lowered to warm up the catalyst in the catalytic converter 20.

That is, under a superhigh expansion ratio cycle having a high mechanical compression ratio, the thermal efficiency becomes high, so the exhaust gas temperature becomes extremely low. Accordingly, the problem arises that for example if idling by a superhigh expansion ratio cycle at engine warm-up, the exhaust gas temperature will be maintained at a low temperature, so the catalyst will not easily become activated. Therefore, in this embodiment of the present invention, at the time of warm-up immediately after engine start-up, the mechanical compression ratio is lowered to raise the exhaust gas temperature and thereby causing the catalyst to become activated at an earlier period.

When the mechanical compression ratio is lowered at the time of idling, the actual compression ratio also is lowered. Accordingly, in an embodiment of the present invention, the actual compression ratio at the time of idling becomes higher, or becomes lower. In this regard, when idling speed control which controls the engine speed at the time of idling to the target idling speed is performed, the change of the actual compression ratio has a large effect on idling speed control. Next, this will be described with reference to FIG. 10.

Figure 10:
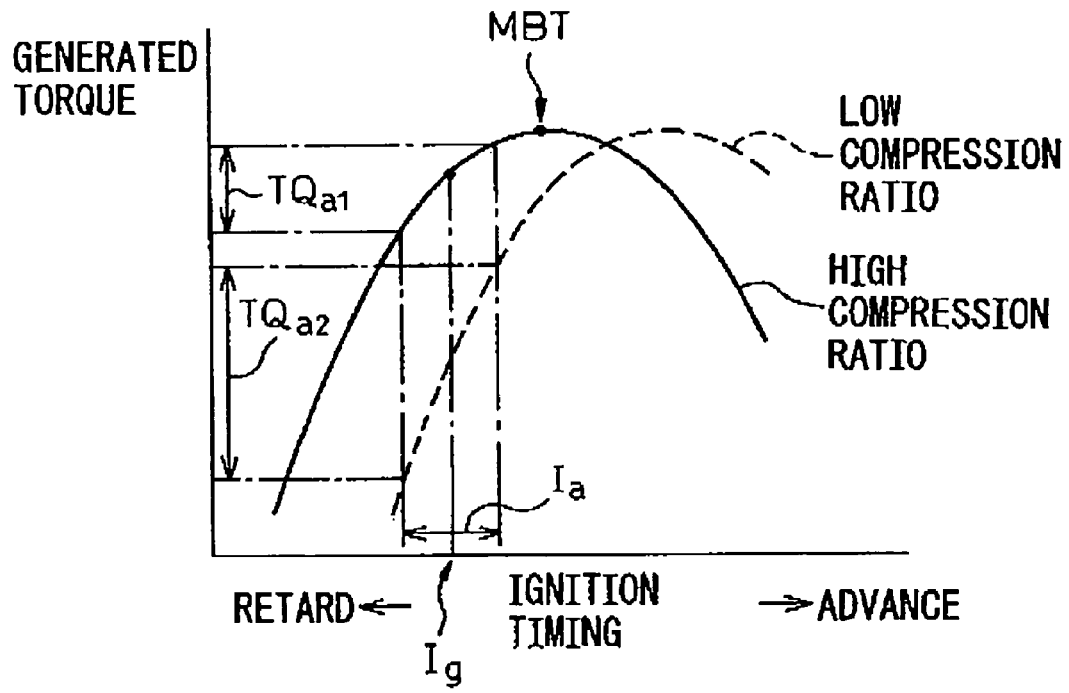
FIG. 10 is a view showing the relationship of the ignition timing and the generated torque of the engine.

FIG. 10 shows the relationship between the ignition timing by the spark plug 6 and the generated torque of the engine at the time of idling. Note that the solid line in FIG. 10 shows when the actual compression ratio at the time of idling is high, while the broken line shows when the actual compression ratio at the time of idling is low.

On the other hand, in FIG. 10, $I_g$ shows the ignition timing when the actual compression ratio at the time of idling is high. When the actual compression ratio at the time of idling is high, when the engine speed is maintained at the target idling speed, for example, 600 rpm, the ignition timing is maintained at this reference ignition timing $I_g$. This reference ignition timing $I_g$ is at the slightly retarded side from the MBT (Minimum Advance for Best Torque). This reference ignition timing $I_g$ is determined in advance in accordance with engine cooling water temperature or other operating conditions of the engine.

Now, in this embodiment of the present invention, when the engine speed deviates from the target idling speed, the ignition timing is temporarily changed to the advance side or retard side with respect to the reference ignition timing $I_g$ so that the engine speed becomes the target idling speed. For this kind of control of the ignition timing, an ignition timing control device is provided.

In this case, if the ignition timing is advanced with respect to the reference ignition timing $I_g$, the generated torque of the engine increases, so the engine speed rises, while if the ignition timing is retarded with respect to the reference ignition timing $I_g$, the generated torque of the engine falls, so the engine speed falls. FIG. 10 shows the amount of variation $TQ_{a1}$ of the generated torque of the engine with respect to the amount of change $I_a$ of the ignition timing at this time. The sensitivity of the amount of variation $TQ_{a1}$ of the generated torque of the engine with respect to the amount of variation $I_a$ of the ignition timing of this time, that is, the change of the generated torque of this engine with respect to the change of the ignition timing, is not that high.

In contrast, when the actual compression ratio at the time of idling becomes small, the MBT moves to the advanced side as shown by the broken line in FIG. 10. Accordingly, when the reference ignition timing $I_g$ is maintained at the same ignition timing, as shown in FIG. 10, the sensitivity of the amount of variation $TQ_{a2}$ of the generated torque of the engine with respect to the amount of variation $I_a$ of the ignition timing, that is, the change of the generated torque of this engine with respect to the change of the ignition timing, becomes very high.

However, a problem is generated in that when the sensitivity of the change of the generated torque of the engine becomes high, the engine speed experiences hunting and the engine speed will not easily settle down to the target idling speed. In this case, to stop the occurrence of hunting of the engine speed, it is necessary for the amount of change $TQ_{a2}$ of the generated torque of the engine at this time to be made substantially the same as the amount of change $TQ_{a1}$ of the generated torque of the engine at the time of a high compression ratio. That is, it is necessary to make the sensitivity of the change of the generated torque of the engine of this time the same as the sensitivity of the change of the generated torque of the engine at the time of a high compression ratio.

Figure 11:
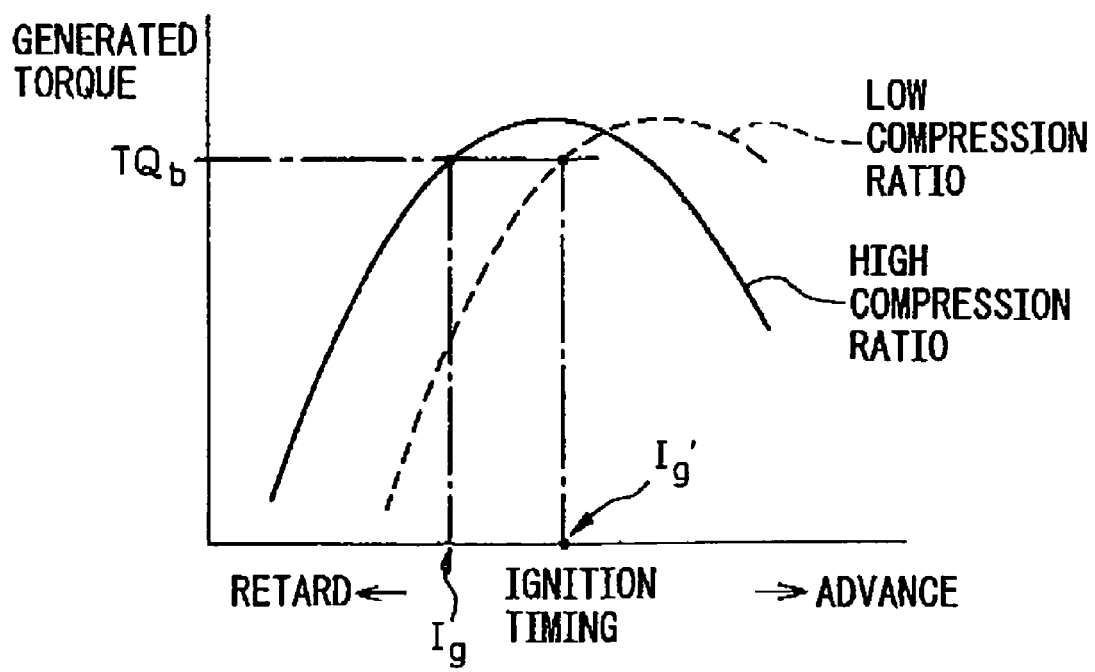
FIG. 11 is a view showing the relationship of the ignition timing and the generated torque of the engine.

Here, in the first embodiment of the present invention, as shown in FIG. 11, when the actual compression ratio at the time of idling is changed from a high compression ratio to a low compression ratio, the reference ignition timing $I_g$ at the time of idling is made to move until the ignition timing $I_g$ obtained from the generated torque $TQ_b$ of the same engine. That is, in the first embodiment, when the actual compression ratio at the time of idling is changed, the reference ignition timing at the time of idling is made to move until the ignition timing at which the same generated torque of the engine is obtained.

Figure 12:
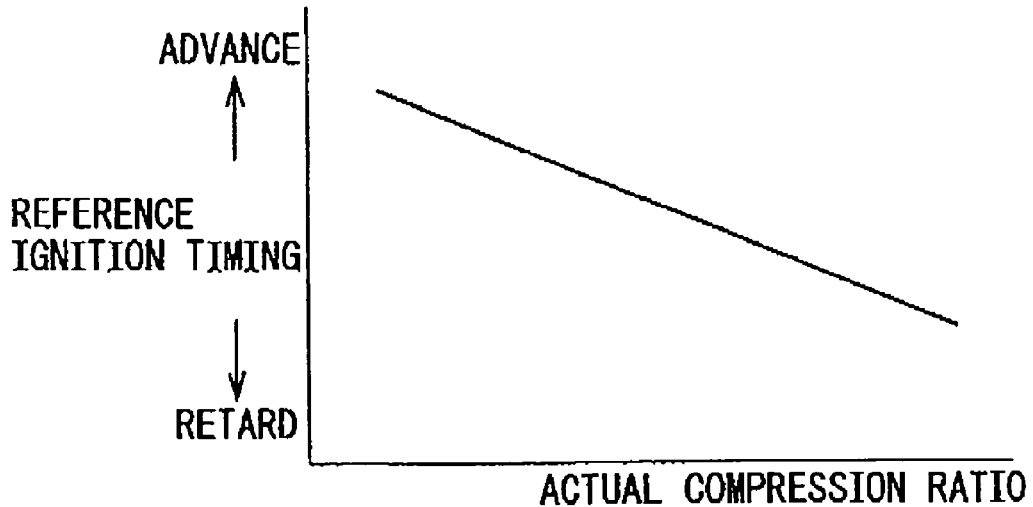
FIG. 12 is a view showing the relationship of the actual compression ratio and the reference ignition timing.

Note that, in this case, as shown in FIG. 12, the lower the actual compression ratio at the time of idling is made, the more the reference ignition timing at the time of idling is made the ignition advance side.

In this way, when the reference ignition timing at the time of idling is made to move until the ignition timing at which the same generated torque of the engine is obtained, the sensitivity of the change of the generated torque of the engine can be maintained at an optimal sensitivity determined in advance regardless of the actual compression ratio. This results in the prevention of engine speed hunting regardless of the actual compression ratio and allows the engine speed to quickly down to the target idling speed.

Figure 13:
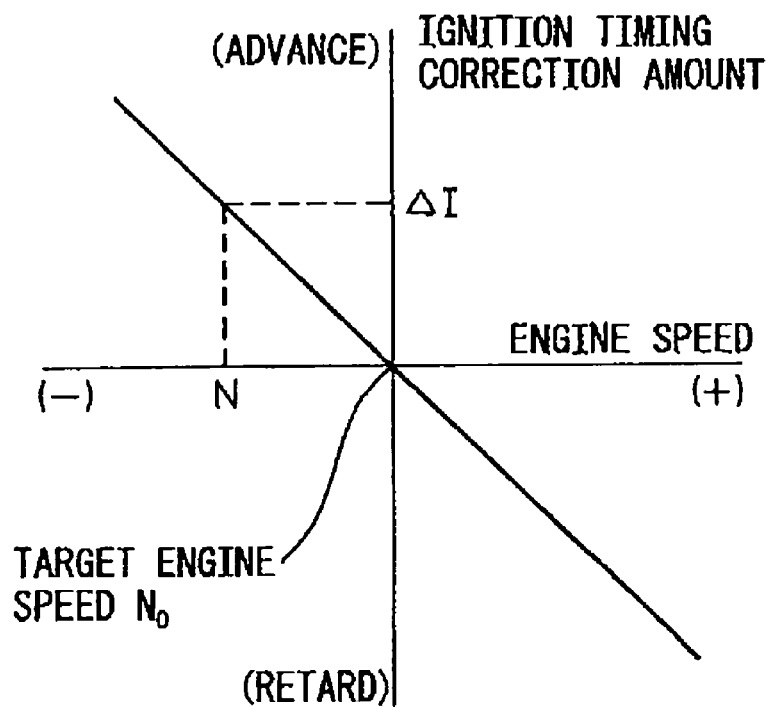
FIG. 13 is a view showing the relationship of the engine speed and the ignition timing correction amount.

FIG. 13 shows the relationship of the amount of deviation $(N-N_0)$ of the engine speed N with respect to the target idling speed $N_0$ and the amount of change of the ignition timing with respect to the reference ignition timing $I_g$, that is, the ignition timing correction amount $\Delta I$. As can be understood from FIG. 13, when the engine speed N is higher than the target idling speed $N_0$, the greater the amount of deviation $(N-N_0)$, the greater the ignition timing correction amount $\Delta I$ in the retardation direction is made, while when the engine speed N is lower than the target idling speed $N_0$, the greater the absolute value of the amount of deviation $(N-N_0)$, the greater the ignition timing correction amount $\Delta I$ in the advance direction is made.

Figure 14:
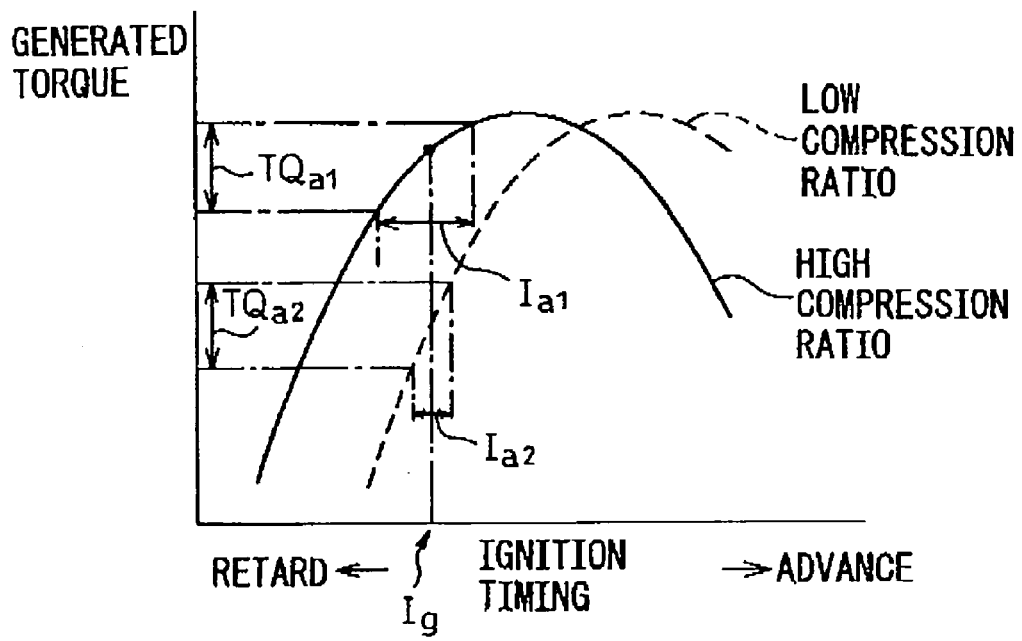
FIG. 14 is a view showing the relationship of the ignition timing and the generated torque of the engine.

Next, a second embodiment of the present invention will be described with reference to FIG. 14 and FIG. 15. In this embodiment, as shown in FIG. 14, even if the actual compression ratio at the time of idling is changed from the high compression ratio to the low compression ratio, the reference ignition timing $I_g$ is not changed. The smaller the actual compression ratio, the smaller the amount of change $I_{a1}$ and $I_{a2}$ of the ignition timing is made so that the amount of change $TQ_{a2}$ of the generated torque of the engine with respect to the amount of change $I_{a2}$ of the ignition timing of this low compression ratio becomes almost exactly the same as the amount of change $TQ_{a1}$ of the generated torque of the engine with respect to the amount of change $I_{a1}$ of the ignition timing of the high compression ratio, that is, so that the sensitivity of the change of the generated torque of the engine of the low compression ratio becomes almost exactly the same as the sensitivity of the change of the generated torque of the engine of the high compression ratio.

Figure 15:
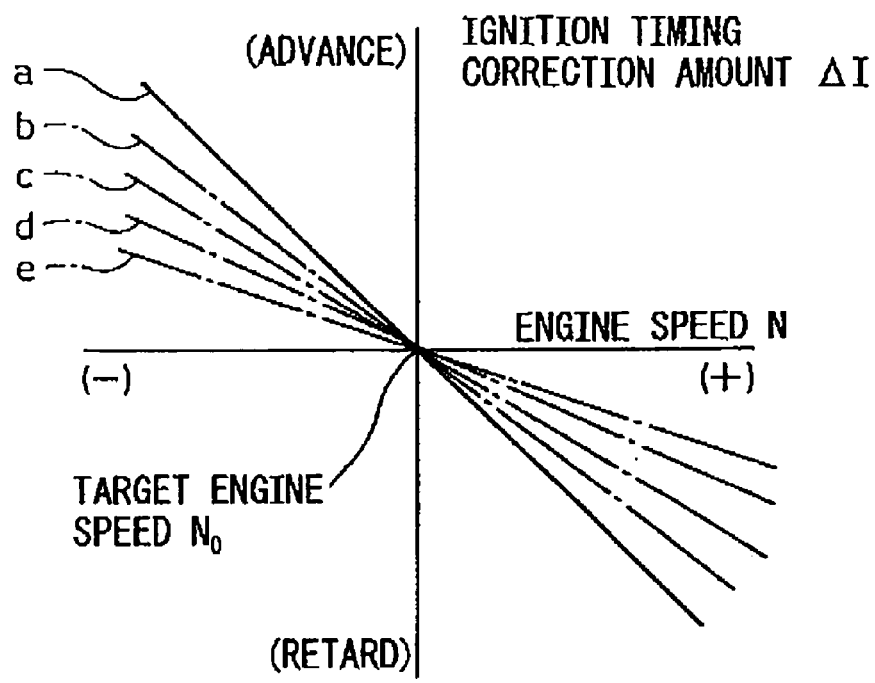
FIG. 15 is a view showing the relationship of the engine speed and the ignition timing correction amount.

The relationship of the amount of change $I_{a1}$ and $I_{a2}$ of the ignition timing, that is, the ignition timing correction amount $\Delta I$ with respect to the reference ignition timing $I_g$, and the amount of deviation $(N-N_0)$ of the engine speed N with respect to the target idling speed $N_0$ is shown in FIG. 15. Note that, in FIG. 15, a shows when the actual compression ratio is the highest and e shows when the actual compression ratio is the lowest. The actual compression ratio becomes lower in the order of a, b, c, d, and e.

In the case shown in FIG. 15 as well, when viewing the actual compression ratios a, b, c, d, and e, when the engine speed N is higher than the target idling speed $N_0$, the greater the amount of deviation $(N-N_0)$, the greater the ignition timing correction amount $\Delta I$ in the retard direction, while when the engine speed N is lower than the target idling speed $N_0$, the greater the absolute value of the amount of deviation $(N-N_0)$, the greater the ignition timing correction amount $\Delta I$ in the advance direction, but the ignition timing correction amount $\Delta I$ with respect to the same amount of deviation $(N-N_0)$ is made lower the lower the actual compression ratio.

That is, in the second embodiment, the lower the actual compression ratio at the time of idling is made, the smaller the ratio of the amount of change $\Delta I$ of the ignition timing with respect to the amount of deviation $(N-N_0)$ of the engine speed from the target idling speed. In this way, if the lower the actual compression ratio at the time of idling, the lower the $\Delta I/(N-N_0)$ is made, the sensitivity of the change of the generated torque of the engine can be maintained at the optimal sensitivity determined in advance regardless of the actual compression ratio. This results in the prevention of engine speed hunting regardless of the actual compression ratio and allows the engine speed to settle quickly to the target idling speed.

Note that, in the present invention, the first embodiment and the second embodiment can be combined. Accordingly, if comprehensively expressing the present invention, when the actual compression ratio at the time of idling is changed, at least one of the ratio of the amount of change of the ignition timing with respect to the amount of deviation of the engine speed from the target idling speed or the reference ignition timing is changed according to the actual compression ratio so that the amount of change of the generated torque of the engine due to the change of the ignition timing becomes almost the same regardless of the actual compression ratio when the engine speed deviates from the target idling speed by the same amount.

Note that, in the actual embodiment of the present invention, an intake air control device for controlling the intake air amount is provided, and when the engine speed deviates from the target idling speed, the intake air amount is changed in addition to the ignition timing so that the engine speed becomes the target idling speed. In this case, in the embodiment shown in FIG. 1, the intake air control device is comprised of a throttle valve 17 arranged in the engine intake air passage.

Figure 16:
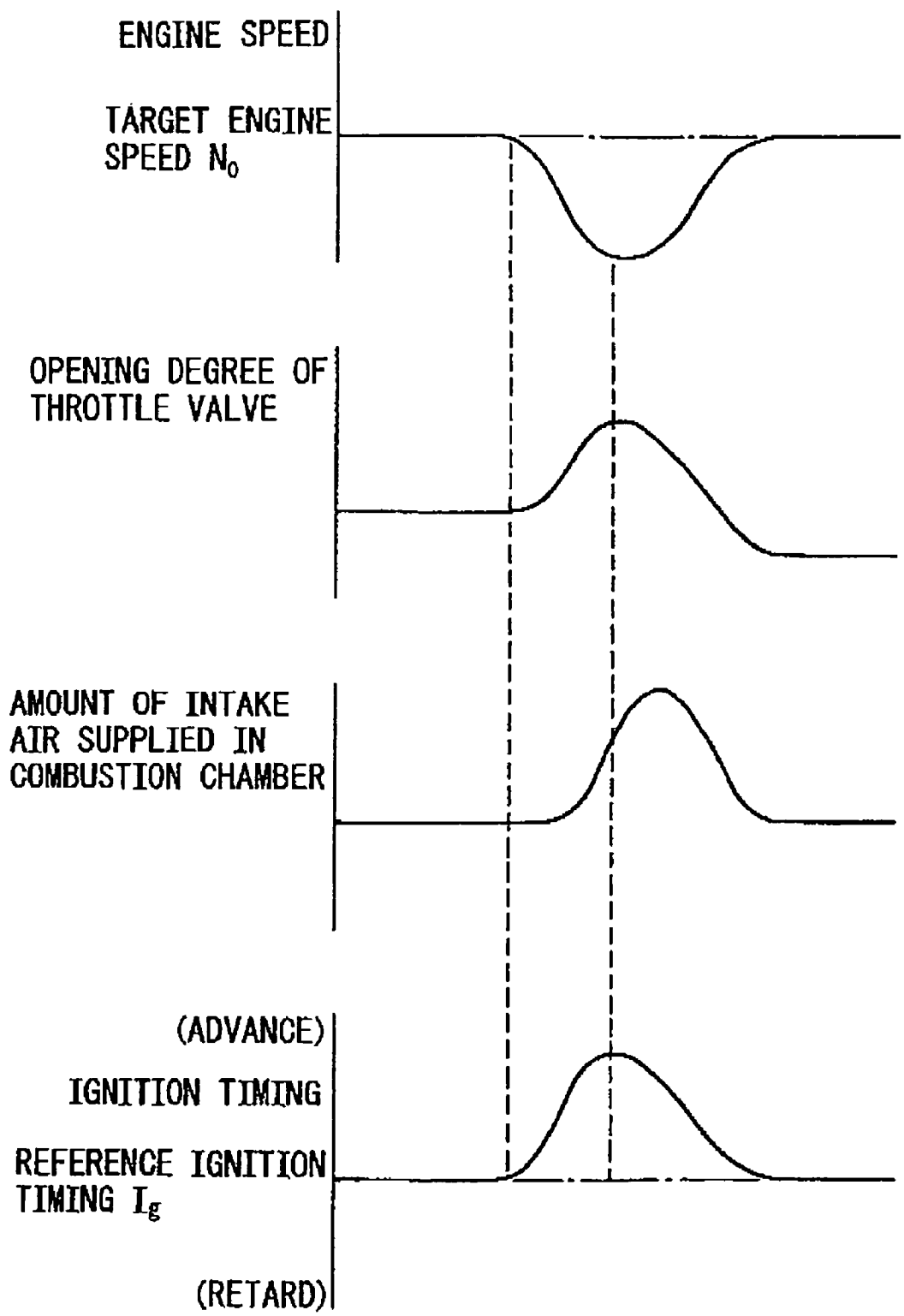
FIG. 16 is a time chart showing the idling speed control.
Figure 17:
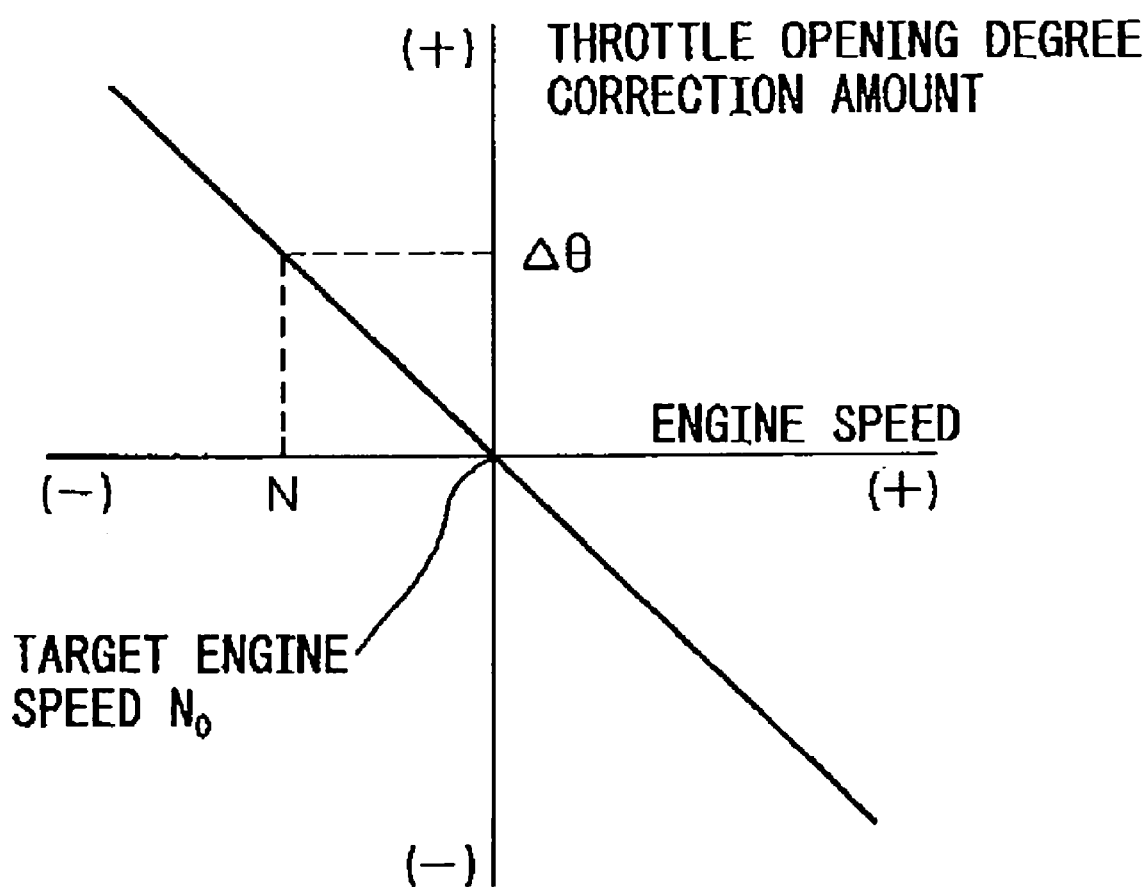
FIG. 17 is a view showing the relationship of the engine speed and the throttle opening degree correction amount.

FIG. 16 shows a time chart for idling speed control. As shown in FIG. 16, when the engine speed becomes lower than the target idling speed $N_0$ at the time of idling, the opening degree of the throttle valve 17 is increased. In the embodiment of the present invention, as shown in FIG. 17, when the engine speed N is higher than the target idling speed $N_0$, the greater the amount of deviation $(N-N_0)$ of the engine speed N with respect to the target idling speed $N_0$, the more the throttle opening degree correction amount $\Delta\theta$ of the valve closing direction is increased, while when the engine speed N is lower than the target idling speed $N_0$, the greater the absolute value of the amount of deviation $(N-N_0)$ of the engine speed N with respect to the target idling speed $N_0$, the more the throttle opening degree correction amount $\Delta\theta$ of the valve opening direction is increased.

When the opening degree of the throttle valve 17 is increased, the amount of intake air supplied in the combustion chamber 5 increases with a delay in time. On the other hand, when the engine speed becomes lower than the target idling speed $N_0$, the ignition timing advances with respect to the reference ignition timing $I_g$. When the ignition timing advances with respect to the reference ignition timing $I_g$, the generated torque of the engine increases, then if the amount of air supplied in the combustion chamber 5 increases, the generated torque of the engine increases further, so the engine speed is returned quickly to the target idling speed $N_0$.

Figure 18:
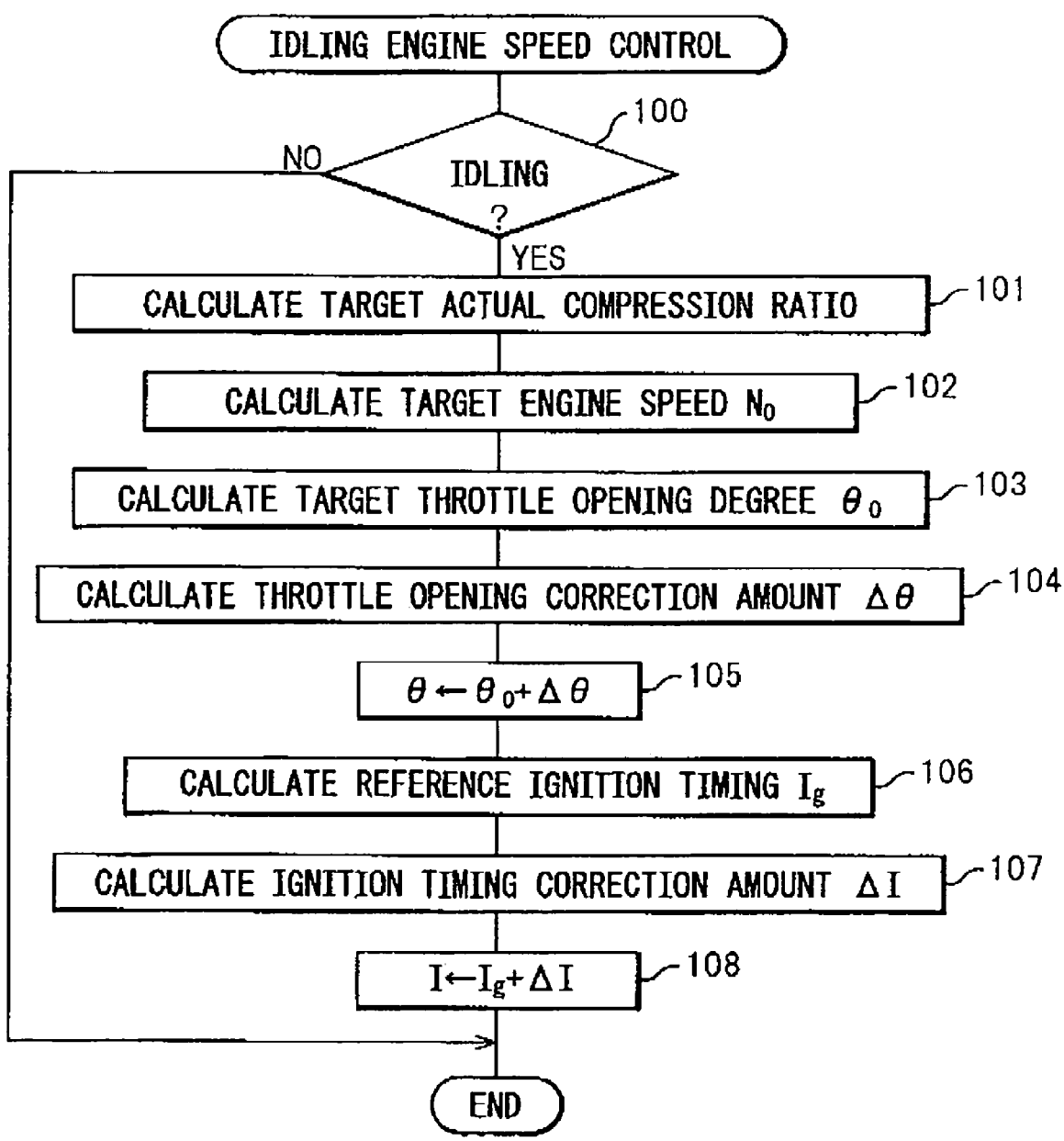
FIG. 18 is a flow chart for executing the idling speed control.

FIG. 18 shows the routine for executing the first embodiment of idling speed control of the present invention. This routine is executed by interruption at constant time intervals.

Referring to FIG. 18, first, at step 100, whether or not the engine is idling is determined. For example, when the amount of depression of the accelerator pedal 40 is zero and the engine speed is lower than the set speed, for example, 1000 rpm, or when the amount of depression of the accelerator pedal 40 is zero and the vehicle speed is no more than the set speed, for example, 5 km/h, the vehicle is judged to be idling.

When idling, the process proceeds to step 101 where the target actual compression ratio is calculated. Next, at step 102, the target idling speed $N_0$ is calculated. Next, at step 103, the target throttle opening degree $\theta_0$ is calculated. Next, at step 104, the throttle opening degree correction amount $\Delta\theta$ is calculated from the relationship shown in FIG. 17 based on the amount of deviation $(N-N_0)$ of the engine speed N with respect to the target idling speed $N_0$. Next, at step 105, a final throttle opening degree $\theta$ $(=\theta_0+\Delta\theta)$ is calculated by adding the throttle opening degree correction amount $\Delta\theta$ to the target throttle opening degree $\theta_0$, and the opening degree of the throttle valve 17 is made this throttle opening degree $\theta$.

Next, at step 106, the reference ignition timing $I_g$ in accordance with the target actual compression ratio is calculated. Next, at step 107, the ignition timing correction amount $\Delta I$ is calculated from the relationship shown in FIG. 13 based on the amount of deviation $(N-N_0)$ of the engine speed N with respect to the target idling speed $N_0$. Next, at step 108, a final ignition timing $I$ $(=I_g+\Delta I)$ is calculated by adding the ignition timing correction amount $\Delta I$ to the reference ignition timing $I_g$, and the ignition timing is made this ignition timing I.

The second embodiment of the present invention is also executed with the idling speed control routine shown in FIG. 18. However, in this case, the same processing as the first embodiment is performed at steps 100 to 105 and step 108, but different processing is performed at step 106 and step 107. That is, when executing the second embodiment in the routine shown in FIG. 18, at step 106, the reference ignition timing $I_g$ which does not change in accordance with the targeted actual compression ratio and changes in accordance with only the engine cooling water temperature and the like is calculated.

Next, at step 107, the ignition timing correction amount $\Delta I$ is calculated from the relationship shown in FIG. 15 based on the amount of deviation $(N-N_0)$ of the engine speed N with respect to the target idling speed No and the target actual compression ratio. Next, at step 108, the final ignition timing $I$ $(=I_g+\Delta I)$ is calculated by adding the ignition timing correction amount $\Delta I$ to the reference ignition timing $I_g$, and the ignition timing is made this ignition timing I.

Note that, at step 105, the amount proportional to the ratio of the amount of deviation $(N-N_0)$ of the engine speed N with respect to the target idling speed $N_0$ is made the throttle opening degree correction amount $\Delta\theta$, and at step 108, the amount proportional to the ratio of the amount of deviation $(N-N_0)$ of the engine speed N with respect to the target idling speed $N_0$ is made the ignition timing correction amount $\Delta I$. That is, at step 105 and step 108, P (proportional) control is performed. However, at step 105 and step 108, in place of P control, PI control, or PD control, or PID control can be performed.

The invention claimed is:

1. An idling control device of a spark ignition type internal combustion engine capable of changing an actual compression ratio, wherein said device comprises an ignition timing control device which maintains an ignition timing at a reference ignition timing determined in advance in accordance with an operating condition of the engine when an engine speed is maintained at a target idling speed at the time of idling operation and which changes the ignition timing to an advance or retard side temporarily with respect to the reference ignition timing so that when the engine speed deviates from the target idling speed, the engine speed becomes the target idling speed, and when the actual compression ratio is changed at the time of idling, at least one of ratio of an amount of change of the ignition timing with respect to an amount of deviation of the engine speed from the target idling speed or the reference ignition timing is changed in accordance with the actual compression ratio so that when the engine speed deviates from the target idling speed, an amount of change of a generated torque of the engine due to the change of the ignition timing becomes substantially the same regardless of the actual compression ratio.

2. An idling control device of a spark ignition type internal combustion engine as set forth in claim 1, wherein when the actual compression ratio at the time of idling is changed, the reference ignition timing at the time of idling is moved until the ignition timing at which the same generated torque of the engine is obtained.

3. An idling control device of a spark ignition type internal combustion engine as set forth in claim 2, wherein the lower the actual compression ratio at the time of idling, the more the reference ignition timing at the time of idling is at the advanced side.

4. An idling control device of a spark ignition type internal combustion engine as set forth in claim 1, wherein the lower the actual compression ratio at the time of idling, the lower the ratio of the amount of change of the ignition timing with respect to the amount of deviation of the engine speed from the target idling speed.

5. An idling control device of a spark ignition type internal combustion engine as set forth in claim 1, wherein said device is provided with an intake air control device for controlling the intake air amount, and when the engine speed deviates from the target idling speed, the intake air amount is changed in addition to the ignition timing so that the engine speed becomes the target idling speed.

6. An idling control device of a spark ignition type internal combustion engine as set forth in claim 5, wherein said intake air control device is comprised of a throttle valve arranged in an engine intake air passage.

7. An idling control device of a spark ignition type internal combustion engine as set forth in claim 6, wherein said device is provided with a variable valve timing mechanism able to control a valve closing timing of an intake valve; the valve closing timing of the intake valve is made to move in a direction away from an intake bottom dead center until a limit valve closing timing able to control an amount of intake air supplied in the combustion chamber along with the engine load becoming lower; in the region of a higher load than the engine load when the valve closing time of the intake value reaches said limit valve closing timing, the amount of intake air supplied in the combustion chamber is controlled by changing the valve closing timing of the intake valve without depending on said throttle valve; and in the region of a lower load than the engine load when the valve closing timing of the intake valve reaches said limit valve closing timing, the amount of intake air supplied in the combustion chamber is controlled by said throttle valve.

8. An idling control device of a spark ignition type internal combustion engine set forth in claim 1, wherein said device is provided with a variable valve timing mechanism able to control a valve closing timing of an intake valve and a variable compression ratio mechanism able to change a mechanical compression ratio, and, when the temperature of a catalyst arranged in an engine exhaust passage should be raised, the mechanical compression ratio is lowered and the actual compression ratio is lowered at the time of idling to raise the exhaust gas temperature.

9. An idling control device of a spark ignition type internal combustion engine set forth in claim 8, wherein as the engine load becomes lower, said mechanical compression ratio is increased up to a limit mechanical compression ratio.

* * * * *